Patented Apr. 13, 1937

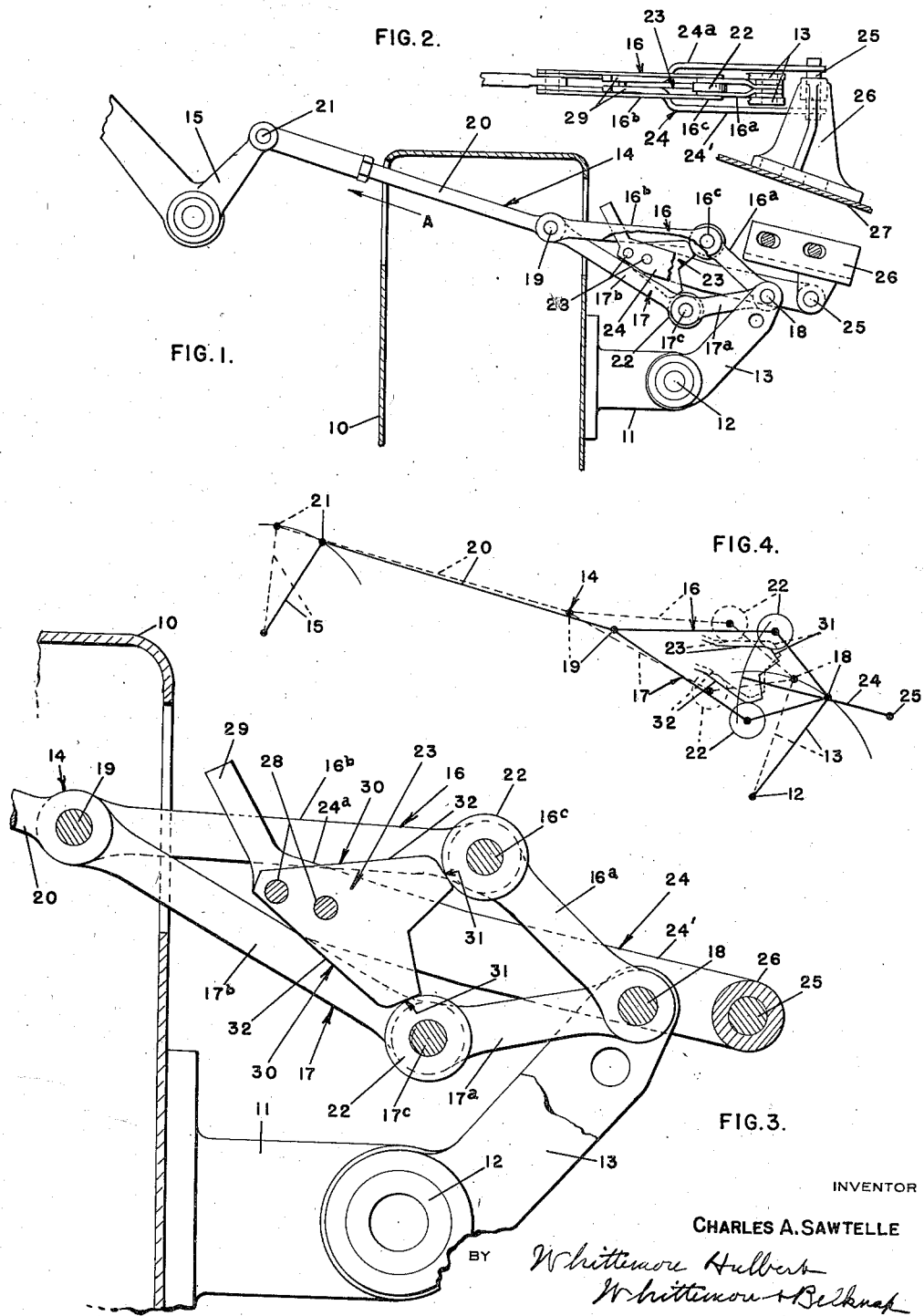

2,076,965

UNITED STATES PATENT OFFICE 2,076,965

BRAKE ACTUATING MECHANISM

Charles A. Sawtelle, Detroit, Mich., assignor to S & D Engineering Company, Detroit, Mich., a corporation of Michigan Application August 20, 1934, Serial No. 740,697

6 Claims. (Cl. 74—518)

This invention relates to brakes and more particularly to brake actuating mechanism.

One of the important objects of the invention is to provide a simple but efficient means for decreasing the travel of the pedal lever or other brake applying means in the operation of applying the brake by incorporating means for quickly taking up the slack in the system and thereafter providing a predetermined constant increased power ratio between the pedal and rockshaft levers.

The several objects, advantages and novel details of construction of the invention will be made more apparent as this description proceeds, especially when considered in connection with the accompanying drawing, wherein Figure 1 is a fragmentary sectional view through a portion of a vehicle chassis showing my improved brake operating mechanism in elevation associated therewith;

Figure 2 is a fragmentary plan view of the structure illustrated in Figure 1;

Figure 3 is an enlarged fragmentary sectional elevational view of the operating mechanism, and Figure 4 is a diagrammatic view illustrating different positions of the mechanism.

Referring now more particularly to the drawing wherein like reference characters indicate like parts, it will be noted that there is fragmentarily illustrated the cross frame member 10 of an automobile chassis frame together with one of the brackets 11 secured thereto which support the brake rockshaft 12. Secured to the rockshaft 12 is the usual rockshaft lever 13 which is connected by connecting means indicated generally by the reference character 14 to the pedal lever 15 or other brake operating means.

The connection between the rockshaft and pedal levers 13 and 15 includes two pairs of pivotally interconnected links 16 and 17, the pair of links 16 consisting of links 16ª and 16ᵇ pivotally interconnected as at 16ᶜ, while the pair of links 17 consists of links 17ª and 17ᵇ pivotally interconnected as at 17ᶜ.

The pairs of links are arranged in substantially spaced apart longitudinally opposed relation, the adjacent free ends of the pairs of links being pivotally connected at one end, as at 18, to the rockshaft lever 13, and pivotally connected at the other adjacent free ends, as at 19, to a connecting rod or the like 20 which in turn is pivotally connected, as at 21, to the pedal lever 15.

From a comparison of Figures 1 and 2, it will be understood that the links 16ª, 16ᵇ, 17ª and 17ᵇ are arranged in pairs with the adjacent ends of the several links straddling one another so as to center the construction.

At the point of pivotal interconnection of each of the pair of links 16 and 17 there is preferably provided a roller or other friction reducing member 22, these rollers being rotatably mounted on the pivots 16ᶜ and 17ᶜ respectively. It will be noted that these rollers are thus located at the knees or knuckles of the pairs of links and are in substantially opposed relation one to the other.

Cooperating with the linkage heretofore described, and acting upon the knuckles of the linkage is a cam member 23. This cam member is arranged between the opposed pairs of links and is mounted on an arm or link 24 formed of a pair of spaced strip-like members 24'. The arm or link 24 is pivotally mounted, as at 25, on a bracket 26 which may be conveniently secured to an X-frame member 27 of the vehicle chassis frame. The cam 23 is secured adjacent the free end of the link or arm 24 as for instance by securing elements 28. Thus the cam is positioned between the opposed pairs of links, but is permitted to swing about its point of pivotal support 25 to accommodate it to the angular displacement of the connection between the pedal and rockshaft levers occasioned during the operation of the brake.

If desired, a projection or extension 29 may be provided on the ends of the sections 24ª of the arm 24 to extend between the sections of the link 16ᵇ to thus prevent any lateral displacement of the cam with reference to the opposed linkage.

The cam 23 is in the form of a double cam having opposed cam profiles 30 identical with one another. Thus each cam profile has an abrupt portion 31 which is arranged in diverging converging relation with reference to the longitudinal center line of the cam member, each cam profile also being provided with a relatively long substantially straight inclined portion 32 which converges towards the center line of the cam member in the direction in which the linkage moves during the application of the brake.

Thus with the herein described construction, when the pedal lever is operated to apply the brake, the connection between the pedal and rockshaft levers moves in the direction of the arrow A (Figure 1) to thus move the pairs of opposed links relative to the cam member 23. During the initial or first part of the brake applying movement, the pairs of opposed links are moved apart by reason of the engagement of the rollers 22 with the outwardly directed abrupt cam surfaces 31. This spreading of the pairs of opposed links shortens the distance between the points of pivotal connection 18 and 19 and thus causes a relatively greater movement of the rockshaft lever 13 than partaken of by the pedal lever 15. This results in a taking up of the slack in the brake system during a minimum amount of travel of the pedal lever. The position of the cam member and the location and arrangement of the linkage is such that this slack take-up occurs during the movement of the rollers from their position of rest to the juncture of the cam surfaces 31 and 32. Thereafter during the further operation of the pedal lever, the rollers 22 are in engagement with the converging cam surfaces 32 which permit the knuckles or knees 16c and 17c of the pairs of links to approach one another thereby lengthening the connection between the pedal and rockshaft levers. This results in an increased power ratio between the pedal and rockshaft levers due to the fact that the pedal lever moves at a greater rate of speed for a given pedal lever movement than the rockshaft lever.

When the pedal lever is released, the parts return to the normal position of rest illustrated in Figures 1 and 3 by a usual spring means (not shown).

When the brakes are applied by the hand lever, the movement of the rockshaft 12 will rock the lever 13, but this will merely spread apart the knuckles of the pairs of links and no movement will be imparted thereby to the pedal lever which would effect the stoplight usually actuated by the pedal lever.

As heretofore pointed out, the pairs of linkage partake of a slight angular shifting movement during the application of the brakes, and to provide for compensating movement of the cam member this cam member is pivoted, as at 25, on the bracket 26 secured to the X-frame member.

In Figure 4 there is diagrammatically illustrated the positions of the parts when the knuckles are at the juncture of the cam surfaces 31 and 32, and when they are being guided by the cam surfaces 32, these positions being shown in full and dotted lines respectively.

With the herein described construction, an increased power ratio between the pedal and rockshaft levers is obtained without lengthening the rockshaft lever, and in addition, means is provided for taking up the slack in the system during the initial movement of the pedal lever when the pedal pressure is light.

By altering the profile of the cam member 23, and by varying the relative length of the pairs of links, the ratio of the relative movement between the pedal and rockshaft levers may be accordingly varied.

While a commercial embodiment of my invention has been illustrated herein somewhat in detail, it will be readily apparent to those skilled in this art that various changes may be resorted to without departing from the spirit and scope of this invention, and to this end reservation is made to make such changes as may come within the purview of the accompanying claims.

What I claim as my invention is:

1. A brake operating means including a pedal lever, a brake rockshaft lever, a connection between said levers including two pairs of pivotally connected links arranged in longitudinally opposed relation, and means acting on said pairs of links to move the same apart to shorten the connection between said levers and subsequently acting on said pairs of levers to cause them to move toward one another to lengthen said connection.

2. A brake operating means including a pedal lever, a brake rockshaft lever, a connection between said levers including two pairs of pivotally connected links arranged in longitudinally opposed relation with the adjacent ends of each pair of links pivotally connected together, and means acting on said pairs of links to move the same apart to shorten the connection between said levers and subsequently acting on said pairs of links to cause them to move toward one another to lengthen said connection.

3. A brake operating means including a pedal lever, a brake rockshaft lever, a connection between said levers including two pairs of pivotally connected links having the free ends of each pair pivotally connected together, and cam means acting on the substantially opposed pivotal connections of each pair of links to control the relative movement of said links during the application of the brake whereby the connection between the levers is initially shortened to take up slack in the system and subsequently lengthened to obtain increased power ratio between the pedal and rockshaft levers.

4. A brake operating means including a pedal lever, a brake rockshaft lever, a connection between said levers including two pairs of longitudinally opposed pivotally connected links, and cam means arranged between the opposed pivotal connections of the pairs of links acting upon movement of the pedal lever in brake applying direction to initially move said pivotal connections apart and subsequently cause said pivotal connections to move toward one another, for the purpose set forth.

5. A brake operating means including a pedal lever, a brake rockshaft lever, a connection between said levers including two pairs of pivotally connected links arranged in longitudinally opposed relation, and cam means engaging the links adjacent the pivotal connections thereof upon brake applying movement to spread the same apart to thus shorten the length of the connection between said levers, said cam means being shaped to permit movement of the pivotal connections aforesaid of the links toward one another at a slower rate after a predetermined interval of brake applying movement of the pedal lever.

6. A brake operating means including a pedal lever, a brake rockshaft lever, a connection between said levers including two pairs of longitudinally opposed pivotally connected links, and a pivotally supported cam arranged between the opposed pivotal connections of the pairs of links and acting upon movement of the pedal lever in brake applying direction to initially move said pivotal connections apart and to subsequently permit the pivotal connections to move toward one another.

CHARLES A. SAWTELLE.